Nov. 1, 1960 C. R. EVANS 2,958,766

AUTOMATIC AUDIENCE RATING SYSTEMS

Filed Nov. 26, 1956 2 Sheets-Sheet 1

INVENTOR

CHAUNCEY RICHARD EVANS

BY [signature]

ATTORNEYS

Nov. 1, 1960 C. R. EVANS 2,958,766

AUTOMATIC AUDIENCE RATING SYSTEMS

Filed Nov. 26, 1956 2 Sheets-Sheet 2

INVENTOR
CHAUNCEY RICHARD EVANS

BY [signature]

ATTORNEYS

United States Patent Office 2,958,766

Patented Nov. 1, 1960

2,958,766

AUTOMATIC AUDIENCE RATING SYSTEMS

Chauncey Richard Evans, Salt Lake City, Utah, assignor to A. C. Nielsen Company, Chicago, Ill., a corporation of Delaware Filed Nov. 26, 1956, Ser. No. 624,359

9 Claims. (Cl. 250—2)

The present invention relates to automatic audience rating systems. In particular, it relates to improvements in television and radio audience measurement systems in which the measuring is done remotely and automatically.

Heretofore, telephone call systems have been used, employing recording instruments at the receivers sampled and various remote recording systems. None of these has proven entirely satisfactory. The telephone call systems involve calling a sample audience to learn what programs, if any, they are watching or hearing. Such systems are time-consuming, expensive, and fail to produce a fair sampling. The use of recording instruments in the homes of listeners enables the samplers to get somewhat more extensive and more useful records, but that, too, is a slow, expensive method. The remote recording systems appear to offer the most promising solution to the problem, but the systems thus far have been expensive, inefficient, slow, and prone to mechanical and electrical failures.

It is an object, therefore, of the present invention to provide an automatic audience rating system which functions at a rapid rate, is simple to install, easy to operate, and relatively inexpensive.

It is a further object to provide an automatic audience rating system which will overcome the disadvantages and defects of the prior art devices, and provide for virtually continuous monitoring of radio and television programs as received by the viewers and listeners.

A more specific object is to provide a system capable of measuring the size of the audience listening to various programs so as to determine the popularity of various artists and programs, and measure the effectiveness of radio or television advertising with greater speed and accuracy than has been possible heretofore.

The foregoing objects and others ancillary thereto, may be accomplished according to a preferred embodiment of the present invention, by placing terminals on the voice-coils of the loudspeakers in a group of sample receivers and providing a similar audio source from a receiver which may be tuned to a succession of known stations. Each of the sample receivers is connected in the circuit in turn. The respective signals are transmitted through telephone lines, or other conductors, to a central location where they are passed through band-pass filters, constant output amplifiers, and full-wave demodulators, to comparing circuits. The comparing circuits are designed to provide output pulses only if the compared signals differ by more than a small amount. If no pulses are produced and steps are taken to prevent a false indication when no program is on, it will be known that the two receivers are tuned to the same program and the same station, and suitable means to indicate or record that fact may be employed.

This embodiment of the invention is illustrated in the accompanying drawings, in which.

Figure 1:
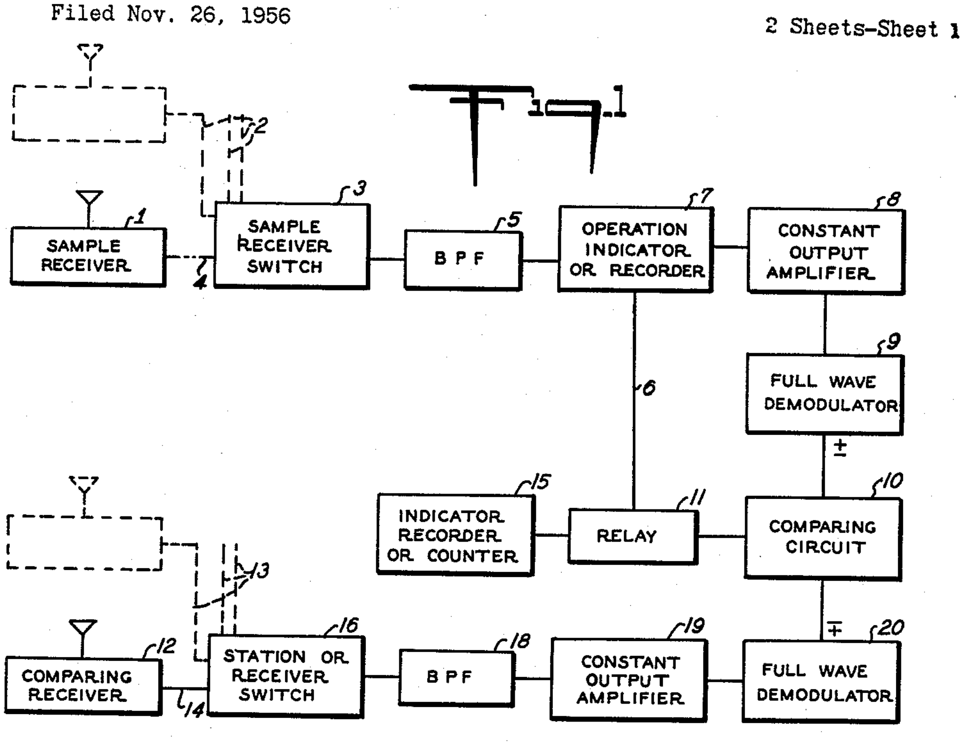
Fig. 1 is a block diagram showing in general the way in which the various components are connected.

In Fig. 1, a sample receiver is illustrated at 1, i.e., a receiver which is located at one of the sampling sites. As indicated by the dash lines 2, there will be many such sites and corresponding receivers 1. The connection from the sampler receiver 1 to a receiver switch 3 and the remaining components of the system would be taken preferably from the voice-coil of the loud-speaker of the receiver 1 in order to get an adequate sample of the audio signal being received. Generally, the connection from the receiver 1 to the switch 3 would be over a telephone line 4, though a suitable connection could be made by radio if the necessary equipment should be installed. At any rate all the equipment shown in the drawings, except the receiver 1 and the lines 2 and 4, is located at a central recording office.

The sample receiver switch 3 is representative of any switching mechanism which may be used to transfer the system from the pickup of one receiver to another. This switch may be a motor driven commutator, a system of relays, or any other conventional system which will operate at a high enough speed for efficient sampling.

A band-pass filter 5 which can be designed to pass any appropriate audio band width is coupled to the sample receiver switch 3. In the experimental stage, a constant-K band-pass filter, with a band between 1,000 cycles and 1,250 cycles, was found to be satisfactory, but the band width is not necessarily critical. The purpose of the filter is to improve identification in a comparing circuit 10, which will be described hereafter.

An operation indicator or recorder 7 is coupled to the band-pass filter and is intended to indicate or record when the sample receiver is in operation and receiving a signal. This indicator 7 actually may be a gating device or other controller, and it could be connected to subsequent indicating, recording or counting apparatus in order to increase the information available from the use of this system, as well as to insure that no false indications are made. It may be connected by a line 6 to a relay 11 to operate the latter and to insure that no false indications will be made when the sample receiver 3 is not connected.

A constant output amplifier 8 is connected with the recorder or indicator 7, as more fully illustrated in Fig. 2, and will be described at greater length hereinafter.

Figure 3:
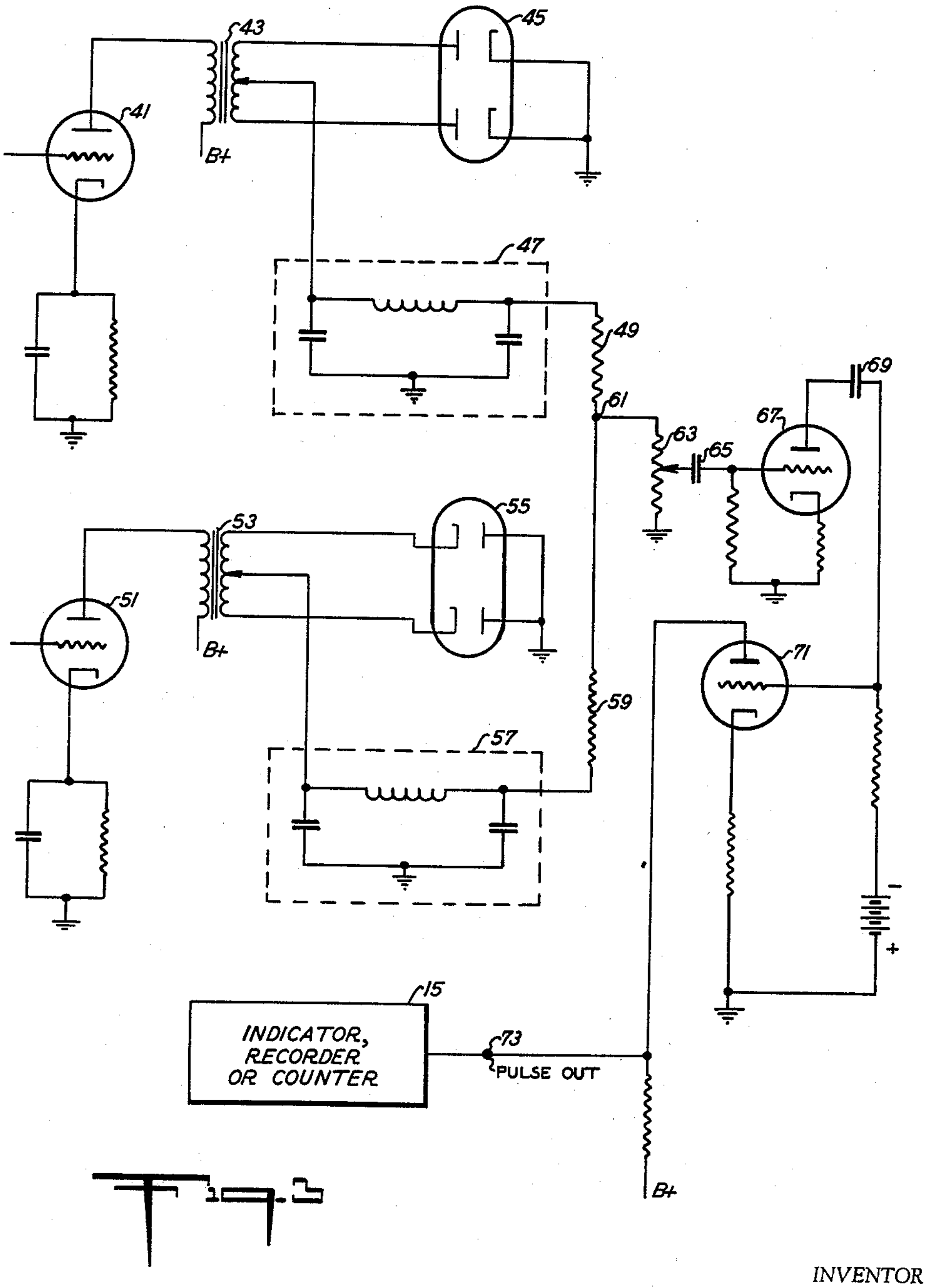
Fig. 3 is a schematic view of the demodulators, the comparing circuits, and the indicator, recorder or counter.

A full-wave demodulator 9, a comparing circuit 10, and an indicator, recorder or counter 15, are combined together and shown in more detail in Fig. 3.

Fig. 1 also shows a circuit which provides a second input to the comparing circuit 10 and which is parallel to the circuit just described. This parallel circuit includes a comparing receiver 12 which is connected by a line 14 to a station or receiver switch 16. The function of the station or receiver switch 16 is to switch the comparing receiver 12 from station to station, or to switch from line 14 to the various lines 13. In the latter case, different receivers, which are turned to separate broadcasting stations, may be successively contacted.

The remaining elements in Fig. 1 function in the same way that their counterparts do in the first-described circuit. The band-pass filter 18, the constant output amplifier 19, and the full-wave demodulator 20 are identical to the corresponding units 5, 8 and 9, in the parallel circuit. The only difference in these units is in the demodulators 9 and 20 which are connected differently in their respective circuits so that their outputs will be 180° out of phase when their inputs are identical and in phase. This difference is shown by the $\pm$ and $\mp$ signs at the output terminals of the demodulators 9 and 20, and is illustrated in detail in Fig. 2.

No counterpart to the operation indicator or recorder 7 is shown in the parallel circuit, since the comparing receiver or receivers will be located at the central office and may be checked easily. Such a device may be added if it becomes necessary or appears desirable.

Figure 2:
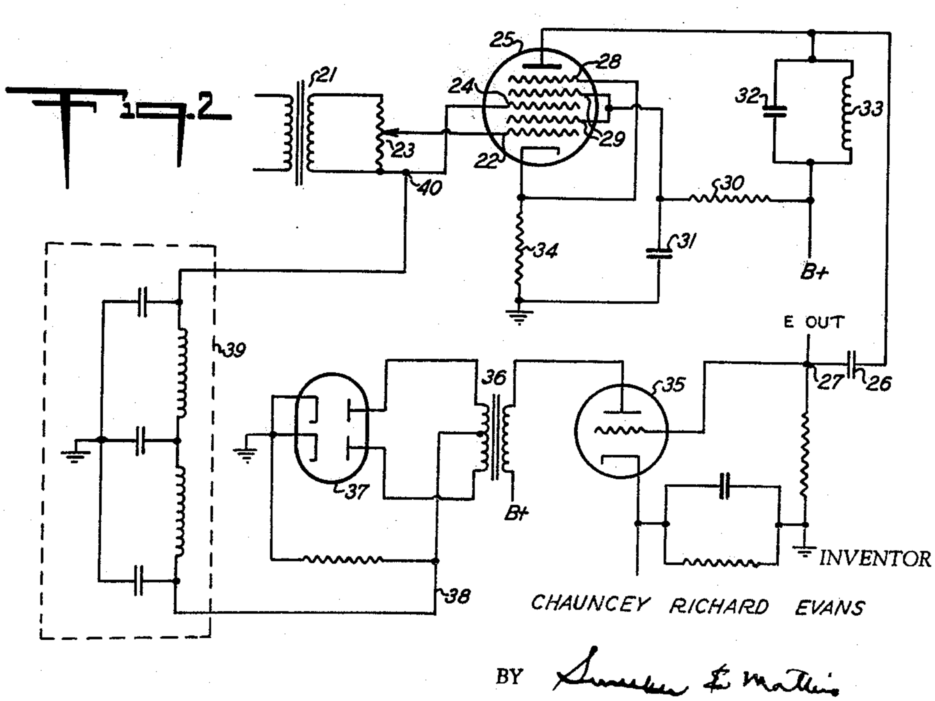
Fig. 2 is a schematic view of the constant output amplifier circuit.

The constant output amplifier, illustrated in Fig. 2, is like that represented in either block 8 or 19 and has the property of compressing the amplitude of the signal. The amplifier used experimentally had the characteristic that level changes on the input of 60 db were compressed to 12 db at the output thereof, designated "E Out." More or less compression might be used. The input transformer 21 of this amplifier feeds the control grids 22 and 24 of a tube 25 through a potentiometer 23. The output of the tube 25 provides the output of the amplifier through coupling condenser 26 at a terminal 27.

The suppressor grid 28 is directly coupled to the cathode. The screen grids 29 are coupled to the plate potential (B+) through a resistor 30, to ground through a condenser 31, and to the anode through the resistor 30, condenser 32 and coil 33. The cathode bias is provided by a resistor 34. There is a feedback from the terminal 27 through a triode 35, transformer 36, full-wave rectifier 37, line 38, low-pass filter 39, to terminal 40, and then to the control grids 22 and 24 of the tube 25.

The demodulators shown in Fig. 3 have inputs from terminals 27 of two amplifiers, such as are shown in Fig. 2, and in blocks 9 and 20 in Fig. 1, through triodes 41 and 51 to transformers 43 and 53, respectively. Full-wave rectifier tubes, shown at 45 and 55, are arranged to provide opposing polarities across resistors 49 and 59, whenever the input signals across the transformers 43 and 53 are in phase. The plate circuits in the tube 45 are arranged with their terminals connected to the transformer, whereas the cathodes are so arranged in the tube 55.

The rectified signal from the tube 45 passes through low-pass filter 47 to the resistor 49, and the rectified signal from the tube 55 passes through the low-pass filter 57 to the resistor 59. As a result of this, the potential at terminal 61 appearing across potentiometer 63 depends on the cumulative potential from the two rectifiers. If the signals to the rectifiers were in-phase and of comparable magnitude, the net voltage at 61 would be nearly zero, since the positive voltage on one side would, in theory, exactly cancel the negative voltage on the other side.

If there is a significant difference in the voltages across the transformers 43 and 53, there will be a potential at 61 which will cause conduction in tubes 67 and 71, through coupling condensers 65 and 69, to produce a pulse-out at terminal 73. The pulse-out will be composed of random pulses according to the syllabic rates of either speech or music. The bias on the grids of tubes 67 and 71 is such that the small voltages which will normally occur at terminal 61 when the inputs to the tubes 41 and 51 are equal, and which are due simply to insignificant differences in input voltages or inequality in the circuits, will not cause a pulse-out.

The pulse-out at 73 feeds into the indicator, recorder, or counter 15. This unit 15 may be composed of a group of recording milliammeters whose number is the same as the number of stations to be sampled. The unit 15 may alternatively be composed of high-speed counters, such as one of the multivibrator types used in digital computers.

The automatic audience rating system of the present invention can be used in the following way:

The sample receiver 1 is a television or radio receiver located at a sampling point such as in a home, hotel, restaurant, or other location where it appears to be desirable to determine whether a particular program is being received or not. As is shown by the dashed lines in Fig. 1, a number of such receivers are located in various places. This number could vary from several dozen to several thousand, depending upon the size of the community and the scope of the sample to be taken. Each of the receivers is connected by a telephone line, indicated at 2 or 4, to a sample receiver switch.

The sample receiver switch 3 could be a motor driven commutator, a system of relays, or any other conventional switching system. It is designed to operate at a speed such that an adequate check may be made to determine which broadcast station, if any, the receiver is tuned to.

The station or receiver switch 16 is designed to act in synchronization with the sample receiver switch 3 so that each program may be sampled from the comparing receiver or receivers during the period that the sample receiver switch is connected to each successive sample receiver. During the time that the sample receiver switch remains in one position, the station or receiver switch will sample each program in turn by either switching a single comparing receiver from one station to the other, or by switching to a succession of comparing receivers, each of which is tuned to a different program. In this way, time is allowed for a comparison to be made between the program being received by each sample receiver and the program being received by each of the corresponding receivers.

In the event that the program received by the sample receiver is the same as that received by a comparing receiver, the signals will pass through the various components shown in Fig. 1, to the comparing circuit where they will cancel each other effectively. This result will be attained by virtue of the fact that the full-wave demodulators 9 and 20 are designed so that the polarity of the two signals will be opposed.

If the programs being received by the sample receiver 1 and the comparing receiver 12 are not the same, the voltages from the two full-wave demodulators 9 and 20 to the comparing circuit 10 will not cancel each other, and there will be a pulse output which can be used to operate an indicator, a recorder, or a counter. The system shown in Fig. 1 has an interlock between the operation indicator or recorder 7 and the relay 11 over line 6 such that the indicator, recorder, or counter 15 will be inhibited if the sample receiver is turned off.

It will be seen from the above description that the automatic audience rating system of the present invention offers many advantages. Among these is the capacity to speedily determine the size of the audience listening or viewing a particular program or programs by using high-speed recorders or counters along with rapid sample switches. It should be possible to obtain almost an immediate determination of the size of the audience by using a very restricted statistical sample. This high-speed operation will make it possible to determine what parts of a program are most popular with various groups, and how to place commercials to minimize the objections to them. At the same time it will be possible to determine the optimum placement of commercials, i.e., how best to place the commercials to reach a large audience of the most likely customers. It should also be possible to determine what types of commercial messages cause an audience loss and to eliminate or change them accordingly.

The system should further make it possible to determine more accurately the popularity of various artists and programs so that they may be employed most effectively. It will be possible to set up a good statistical sample over any given area and always get returns at the same points for comparison purposes, regardless of whether particular receivers are being employed or not, and regardless of whether the potential audience is present or not. It should further make it possible to determine the types of audience appealed to by various programs.

The system is capable of large economies of time and money, since it is capable of performing its functions more quickly than has been possible heretofore. It will be inexpensive in operation in comparison with prior systems, since it is capable of measuring simultaneously the audiences of all the broadcast programs in a given area, thus having a very large earning potential. The savings in time is substantial, since the results obtained are very quickly available for whatever use they may have.

Many modifications of the above specific embodiments of the present invention are possible. The invention, therefore, is not to be restricted, except insofar as is necessitated by the prior art and by the spirit of the appended claims.

I claim:

1. Apparatus for determining the size of an audience listening to a broadcast program comprising a sample receiver, a standard or comparing receiver, means for sampling the audio signals received at said sample receiver, filtering means connected to said sampling means for eliminating all but certain frequencies, means connected to said filtering means for compressing the volume of the resulting signal, means connected to said means for compressing the volume for demodulating said signal, and means for comparing said demodulated signal from said demodulating means with a second demodulated signal from said standard or comparing receiver.

2. Apparatus for determining the size of an audience listening to a broadcast program comprising a standard or comparing receiver, means adapted to be connected to a sample receiver for sampling the audio signal being received at said sample receiver, means connected to said sampling means for eliminating all but certain frequencies, means connected to said means for compressing the volume of the resulting signal, means connected to said volume compressing means for demodulating said signal, and means for comparing said demodulated signal with a demodulated signal from said standard or comparing receiver.

3. Apparatus for determining the size of an audience listening to a broadcast program comprising a standard or comparing receiver, means adapted to be connected to a sample receiver for sampling the audio signal being received at said sample receiver, filtering means connected to said sampling means for eliminating all but certain frequencies, means connected to said filtering means for compressing the volume of the resulting signal, full-wave rectifying means connected to said volume compressing means for demodulating said signal, resistor means connected to said full-wave rectifying means for comparing said demodulated signal from said sample receiver with a demodulated signal from said standard or comparing receiver, and means for utilizing the result.

4. Apparatus for determining the size of the audience listening to a broadcast program comprising a standard or comparison receiver, means adapted to be connected to a sample receiver for sampling the audio signal being received at said sample receiver, filtering means connected to said sampling means for eliminating all but certain frequencies, means connected to said filtering means for compressing the volume of the resulting signal, means connected to said volume compressing means for demodulating said signal, means for comparing said demodulated signal with a demodulated signal from said standard or comparing receiver, and means for utilizing the result.

5. Apparatus for measuring the audience of broadcast programs comprising a source of reference signals, switch means connected to several receivers for detecting the audio signals being received at each of said receivers, means connected to each of said switch means for selecting each of said signals separately, filtering means in series with the switch means for eliminating certain unwanted frequencies, volume compressing means in series with the filtering means for compressing the amplitude of the signals, rectifying means in series with the amplitude compressing means for demodulating the signals, and means connected to the rectifying means for comparing said demodulated signals with said reference signals to determine whether the signals are alike.

6. Apparatus for determining the size of the audience listening to a broadcast program comprising means connected for sampling the audio component of a first signal, filtering means connected thereto for passing certain frequency components only of said first signal, means connected to said filtering means for compressing the volume of said first signal, means connected to said volume compressing means for demodulating said first signal, means connected for sampling the audio component of a second signal, filtering means connected thereto for passing only certain frequency components, means connected to said filtering means for compressing the volume of said second signal, means connected to said volume compressing means for demodulating said second signal, means connected for comparing said first demodulated signal with said second demodulated signal, and means connected for recording the result of the comparison.

7. Apparatus for determining the size of the audience listening to a broadcast program comprising a sample receiver, sampling means connected for sampling the audio component of a first signal being received at said sample receiver, filtering means connected to said sampling means for passing certain frequency components only of said signal, volume compressing means connected to said filtering means for compressing the volume of said first signal, demodulating means connected to said volume compressing means for demodulating said first signal, a reference receiver, switch means for switching from one station to another at said reference receiver, second sampling means connected for sampling the audio component of a second signal being received at said reference receiver, filtering means connected to said second sampling means for passing certain frequencies only, second volume compressing means connected to said filtering means for compressing the volume of said second signal, second demodulating means connected to said second volume compressing means for demodulating said second signal, comparing means connected to said first and second demodulating means for comparing said first demodulated signal with said second demodulated signal, and means connected for recording the comparison thereof, whereby the size of the audience may be determined.

8. In a circuit for determining the size of the audience listening to a broadcast program comprising a sample receiver, a standard or comparing receiver, separate filter means connected to each receiver, separate volume compressing means connected to said filter means, separate demodulating means connected to said volume compressing means, and a comparing circuit connected to said demodulating means comprising first means receiving first input signals from one of said demodulating means, and second means receiving second input signals from the other of said demodulating means, and potentiometer means connected to said first and second means whereby the voltage in said first and second means may be compared.

9. A system for determining the tuning condition of a wave signal receiver operable to reproduce signals in the audio frequency range comprising sampling means for selecting signals from said receiver in only a narrow band of said frequency range, means connected to said sampling means for converting said selected signals into a corresponding direct current signal, standard signal generating means for providing a plurality of direct current signals each individually corresponding to the signal in only said narrow band of said frequency range resulting from the transmission from a related one of a plurality of wave signal transmitters, comparing means for comparing the direct current signal corresponding to said selected signals with the plurality of signals provided by said standard signal generating means, and indicator means controlled by said comparing means for producing an indication of the tuning condition of said wave signal receiver.

References Cited in the file of this patent

UNITED STATES PATENTS

| | | |
|---|---|---|
| 1,739,520 | Potter | Dec. 17, 1929 |
| 2,111,765 | Franks | Mar. 22, 1938 |
| 2,373,180 | Faltico | Apr. 10, 1945 |
| 2,513,360 | Rahmel | July 3, 1950 |
| 2,630,366 | Rahmel | Mar. 3, 1953 |
| 2,662,168 | Scherbatskoy | Dec. 8, 1953 |
| 2,716,702 | Reynolds | Aug. 30, 1955 |
| 2,760,008 | Schade | Aug. 21, 1956 |
| 2,766,374 | Hoffmann | Oct. 9, 1956 |
| 2,773,980 | Oliver | Dec. 11, 1956 |
| 2,773,981 | Goodall | Dec. 11, 1956 |
| 2,784,263 | Curry et al. | Mar. 5, 1957 |
| 2,788,441 | Zimmerli | Apr. 9, 1957 |